(12) United States Patent
Rosenberger

(10) Patent No.: US 7,437,331 B1
(45) Date of Patent: Oct. 14, 2008

(54) SHORT MESSAGE SERVICE (SMS) E-COMMERCE

(75) Inventor: Frank Rosenberger, Meerbusch (DE)

(73) Assignee: Vodafone Holding GmbH, Düsseldorf (DE)

( * ) Notice: Subject to any disclaimer, the term of this patent is extended or adjusted under 35 U.S.C. 154(b) by 1561 days.

(21) Appl. No.: 10/048,855

(22) PCT Filed: Aug. 2, 2000

(86) PCT No.: PCT/DE00/02624

§ 371 (c)(1),
(2), (4) Date: Feb. 1, 2002

(87) PCT Pub. No.: WO01/13341

PCT Pub. Date: Feb. 22, 2001

(30) Foreign Application Priority Data

Aug. 12, 1999 (DE) ................................ 199 38 201

(51) Int. Cl.
*G06Q 99/00* (2006.01)
(52) U.S. Cl. .......................................... 705/77; 705/35
(58) Field of Classification Search ............. 705/30–42, 705/75–77
See application file for complete search history.

(56) References Cited

U.S. PATENT DOCUMENTS

| 5,608,778 | A | * | 3/1997 | Partridge, III | ................ 455/411 |
| 6,032,136 | A | * | 2/2000 | Brake et al. | .................... 705/41 |
| 6,145,740 | A | * | 11/2000 | Molano et al. | .............. 235/380 |
| 7,158,947 | B1 | * | 1/2007 | Findley | ........................ 705/26 |
| 7,184,747 | B2 | * | 2/2007 | Bogat | .......................... 455/406 |

* cited by examiner

*Primary Examiner*—Frantzy Poinvil
(74) *Attorney, Agent, or Firm*—Cohen Pontani Lieberman & Pavane LLP

(57) ABSTRACT

A method for making a purchase of products or services via the Internet by a customer from a vendor includes transmitting, by the customer, a purchase request and mobile subscriber identification data representing the mobile subscriber identification number to the vendor via a mobile radio network. The vendor forwards the purchase request and the mobile subscriber identification data to a security device. A transaction number for the purchase present in the mobile radio network is then transmitted to the security device and the customer. The customer sends the transaction number it receives to the vendor and this transaction number received by the vendor is checked for validity. If the transaction number is valid, billing for the purchase is initiated.

23 Claims, 1 Drawing Sheet

SHORT MESSAGE SERVICE (SMS) E-COMMERCE

BACKGROUND OF THE INVENTION

The invention relates to methods and devices for carrying out and billing for a purchase, initiated via the Internet, of a customer from a vendor of products or services.

SUMMARY OF THE INVENTION

It is the object of the present invention to provide as efficiently and reliably as possible for carrying out and billing for purchases of a customer by means of a mobile radio terminal via the Internet.

The object is achieved by combining identification processes at the mobile radio network end (particularly Clip transmission of the MSISDN) with transaction-related transaction numbers, the method according to the invention is very convenient for the customer, on the one hand, and, on the other hand, very secure both for the customer and for the vendor.

The invention is particularly suitable for a purchase request initiated by a customer via mobile radio terminal via the Internet (for example via a WAP homepage of the vendor); however, it can also be used for authentication, credit check and transaction for accounting for purchases which were initiated by a customer with a computer via the fixed network (e.g. via the homepage of the vendor), in which case it is only the identity check by means of transaction number and mobile subscriber identification number (particularly the Mobile Station International Subscriber Directory Number (MSISDN)) which takes place via a mobile radio terminal of this customer. The financial accounting can be done very efficiently via the telephone bill (mobile radio bill) of the customer. As an alternative, it can also be done by debiting a bank account of the customer with an amount and crediting this amount to a bank account of the vendor.

BRIEF DESCRIPTION OF THE DRAWINGS

Other features and advantages of the invention emerge from the claims and the subsequent description of the invention with reference to an exemplary embodiment, in which, as the single FIGURE.

DETAILED DESCRIPTION OF THE PREFERRED EMBODIMENTS

Figure 1:
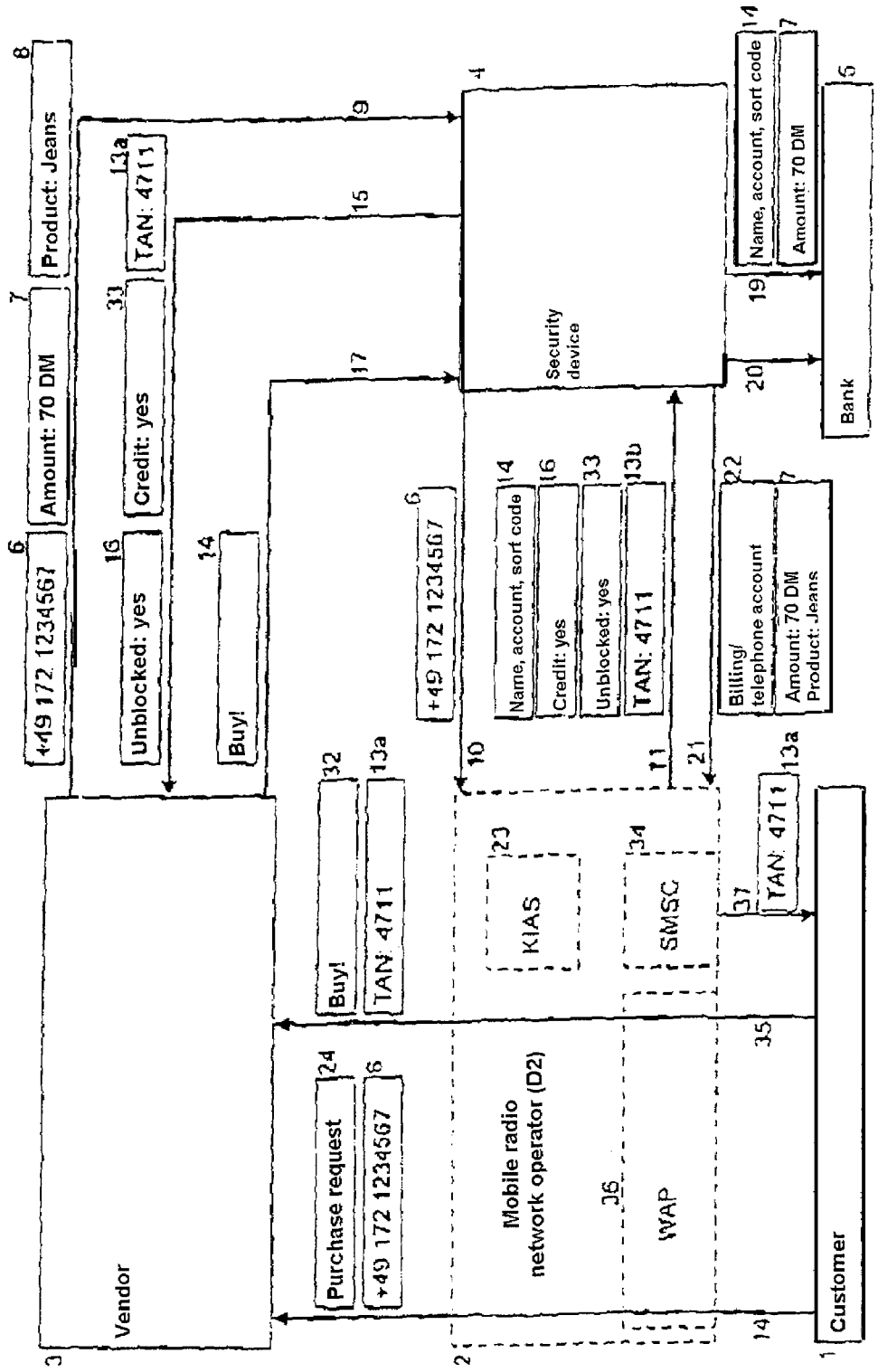
FIG. 1 shows a block diagram of the transaction and billing for a purchase via the Internet, according to the invention.

FIG. 1 shows a customer 1 (with a mobile radio terminal with a subscriber identity module SIM), a mobile radio network operator 2 of a mobile radio network, a vendor 3 of products or services, a security device 4 which can be accessed by the mobile radio network operator or belongs to him, and a bank 5.

In particular, customer 1, vendor 3, security device 4 and bank 5 in this case mean their terminals (communication devices, computers, databases).

The customer 1 is surfing the Internet. In principle, this can be done by a computer via fixed network. In this case, it takes place by means of a mobile radio terminal, not shown, with a SIM card, for example according to GSM or UMTS. In this case, the customer 1 is surfing with a mobile radio terminal by WAP 36 on the Internet via the mobile radio network 2. The customer 1 selects a product, offered on a homepage of the vendor 3, for example by clicking on a corresponding button on the homepage of the vendor by means of a mouse. To be able to account for the purchase, the vendor 3 asks for the mobile radio telephone number 6 of the customer 1 (for example interactively through his host for the homepage). It is possible that this can also be transmitted to him by Clip during the surfing. With his purchase request 24, the customer 1 performs a transmission step 7 in which he transmits (via his mobile radio terminal) his mobile subscriber identification number in the form of his mobile radio telephone number 6 (+491721234567), for example by WAP by mobile radio or by mobile radio short message to the vendor 3. The vendor 3 transmits at least this mobile radio telephone number 6 (and in this case other data in the form of the amount of 70.00 DM of the purchase price 12) and the product name ("Jeans") 8 to the security device 8 in transmission step 9 or, for example, encrypted via a fixed network and/or VPN. Following this, the security device 4 transmits at least the mobile radio telephone number 6 in transmission step 10 to the mobile radio network operator 2. Using the mobile radio telephone number 6, the mobile radio network operator 2 then checks whether an accounting of purchases via the Internet, according to the invention, is unblocked for the mobile radio number 6. This check can be done, for example, by a WAP server 36 or by accessing a corresponding file (for example in the Home Location Register (HLR) or in the Accounting System (KIAS) or in the Network Management Center (NMC)). During this process, the credit of the mobile radio user having the telephone number 6 can also be checked. If the check of the unblocking for this telephone number 6 is positive and a possible check of the credit by the mobile radio operator 2 (and/or a bank) is positive, the mobile radio network operator 2 provides for the purchase to be carried out and billed via the Internet. For this purpose, the data indicating name, account, sort code 14, positive credit check 16, unblocked status check 33, and transaction number 13*b* are transmitted by the mobile radio network operator 2 to the security device 4 in transmission step 11. If the billing is to take place later on the mobile radio bill of the customer 1 (for example by specifying the price and/or the vendor and/or the product), only the transaction number 13*b*, i.e., TAN 4711, may be transmitted for this purpose (which can also implicitly represent the unblocking and credit for the mobile radio number 6 due to its transmission). If the billing is to be done via an account at a bank 5, the account number, sort code and name 14 are additionally transmitted by the mobile radio network operator 2 to the security device 4 in transmission step 11. The transaction number 13*a* generated and/or stored in a device (computer with database) in the mobile radio network is also transmitted from there to the customer 1 in transmission step 37 for example by short message by the SMSC 34 of the mobile radio operator to a mobile radio terminal of the customer 1. In this case, the transaction number 13*a* for the customer 1 is identical with that transaction number 13*b* for the security device 4 and/or the vendor 3. This transaction number TAN 4711 is transmitted in transmission step 35 by the customer 1 to the vendor 3 by mobile radio. This can be done, e.g. either by short message 34 or via the WAP protocol 36. During this process or after it, the customer 1 can again confirm, if necessary, that he wishes to buy 32. In step 15 (independently, that is to say before, simultaneously with or after step 7), the security device 4 transmits to the vendor 3 information 16, 33 on the unblocking and/or credit rating of the mobile radio number 6 (by a fixed network etc.).

The transaction numbers 13*a*, 13*b* can be checked, in particular, at the vendor 3 or the security device 4.

As soon as the transaction number 13a was transmitted in transmission step 35 to the vendor 3 (if necessary, with a confirmation 32 that the customer 1 wants to or wishes to buy) and, on the other hand, he has received the explicit or implicit message 16 that the user is unblocked and, if necessary, credit is available, he can transmit (possibly after checking his stock) the telephone number 6 of the customer and the amount 12 and the product name 8 to the security device 4 in transmission step 17. If the TAN 13a is to be checked in the security device 4, the TAN 13a is also transmitted in transmission step 35 to the vendor 3 by the customer 1 and is transmitted via transmission step 17 during this process and the transaction number is checked in the security device 4 by comparing the transaction number 13b transmitted to the security device 4 by the mobile radio network operator 2 with the transaction number 13a transmitted by the vendor 3 (first transmitted to the latter by the customer 1) to the security device 4, whereupon an acknowledgement can be made to the vendor 3 and an accounting is initiated.

As an alternative, the transaction number 13b transmitted to the security device 4 by the mobile radio network operator 2 is transmitted to the vendor 3 with the message 16 and this transaction number 13b is compared with the transaction number 13a transmitted to the vendor 3 by the customer 1, at the vendor 3 (=in the computer of the vendor), whereupon, in the case of a positive check (equality) of the transaction numbers 13a, 13b, a purchase confirmation including the mobile radio telephone number 6, the amount 12, and the product 8 is transmitted to the security device 4 which initiates accounting transmission steps 19, 20 and 21, respectively (the vendor's account can be credited via transmission step 20 in this case, e.g. via the bank 5).

The purchase can be billed by the security device 4 transmitting to a bank (by a fixed network etc.) information relating to the account number, sort code, name 14, purchase price 7 and product name 8 in transmission step 19 with the instruction to debit an account of the customer 1, identified by the data 14, at the bank 5 with the purchase price and to credit an account, specified during this process or after the transmission step 20, of the vendor 3 with this price. It is even simpler if, as an alternative, instead of the transmission steps 19, 20 to a bank, an information item 22 is transmitted to the KIAS 23 etc. of the mobile radio network operator 2 by a fixed network or mobile radio etc. in transmission step 21, the information transmitted containing a debiting request 22, the product information 8 and the price 7 and the vendor 3, whereupon the customer 1 is also billed with the price 12 with the next telephone bill. In this case, the vendor's account can be credited, e.g. via the bank 5.

The invention claimed is:

1. A method for effecting a purchase requested by a customer from a vendor via the Internet and billing for the purchase, said method comprising the steps of:
   (a) transmitting, by the customer, a purchase request and mobile subscriber identification data representing a mobile subscriber identification number of the customer to the vendor via a mobile radio network;
   (b) forwarding, by the vendor, the mobile subscriber identification data to a security device;
   (c) transmitting, by the security device, at least the mobile subscriber identification number related to the mobile subscriber identification data received from the vendor to the mobile radio network;
   (d) in response to receiving the at least the mobile subscriber identification number from the security device, generating, by the mobile radio network, a transaction number for the purchase and transmitting the transaction number from the mobile radio network to the customer and the security device;
   (e) forwarding, by the customer, the transaction number to the vendor;
   (f) checking, by the security device or the vendor, whether the transaction number forwarded to the vendor by the customer in said step (e) is valid by determining whether the transaction number forwarded to the vendor by the customer matches the transaction number transmitted to the security device by the mobile radio network in said step (d); and
   (g) initiating billing of the purchase if the transaction number checked in said step (f) is valid.

2. The method of claim 1, wherein said step (a) of transmitting the purchase request and the mobile subscriber identification data to the vendor includes transmitting the purchase request and the mobile subscriber identification data using Wireless Application Protocol via the mobile radio network and the Internet.

3. The method of claim 1, wherein said step (a) of transmitting the purchase request and the mobile subscriber identification data to the vendor includes using a fixed network.

4. The method of claim 1, wherein the mobile subscriber identification data includes the telephone number of the customer.

5. The method of claim 1, wherein the transaction number forwarded by the customer in said step (e) is determined to be valid in said step (f) if the transaction number transmitted by the mobile radio network in said step (c) and the transaction number forwarded by the customer in said step (e) are identical.

6. The method of claim 1, wherein said step (a) of transmitting the mobile subscriber identification data includes transmitting the mobile subscriber identification data using the mobile radio network.

7. The method of claim 6, wherein said step (a) of transmitting the mobile subscriber identification data includes using one of a clip transmission for transmitting a caller ID and a Wireless Application Protocol.

8. The method of claim 1, wherein said step (c) of transmitting a transaction number includes transmitting the transaction number to the customer using Short Message Service.

9. The method of claim 1, further comprising the step of forwarding, by the vendor, the transaction number that was forwarded to the vendor by the customer in said step (e) to the security device.

10. The method of claim 9 further comprising the step of checking whether the customer is unblocked for making the purchase before said step (g) of initiating the billing.

11. The method of claim 10, wherein said step of checking whether the customer is unblocked is performed before said step of forwarding the transaction number to said security device and said step of forwarding the transaction number to said security device is performed if the customer is unblocked for making the purchase.

12. The method of claim 9, wherein said step (f) of checking comprises comparing the transaction number forwarded to the vendor by the customer in said step (e) to the transaction number forwarded to the security device by the mobile radio network in said step (c).

13. The method of claim 1, wherein said step (f) of checking comprises comparing the transaction number forwarded to the vendor by the customer in said step (e) to the transaction number forwarded to the security device by the mobile radio network in said step (c).

14. The method of claim 1, wherein the transaction number is valid for a period of time, and if said step (f) of checking is performed after this time period the result of the step of checking is negative.

15. The method of claim 1 further comprising the step of checking whether the customer is unblocked for making the purchase before said step (g) of initiating the billing.

16. The method of claim 15, wherein said step of checking whether the customer is unblocked is performed before said step (d) of transmitting the transaction number to the customer and said step (d) of transmitting the transaction number to the customer is performed if the customer is unblocked for making the purchase.

17. The method of claim 1, further comprising the step of checking, by said mobile radio network and a bank, a credit rating of the customer before said step (c).

18. The method of claim 15, further comprising the step of checking, by said mobile radio network and a bank, a credit rating of the customer before said step (c).

19. The method of claim 1, further comprising the step of billing the customer via a telephone bill of the customer, by an operator of the mobile radio network used during the purchase.

20. The method of claim 1, further comprising the step of billing the customer by the security device by transmitting an instruction for debiting an account of the customer at a bank and crediting an account of the vendor at the bank.

21. A vendor device for effecting a purchase by a customer from a vendor, the vendor device comprising:
   means for receiving a purchase request and mobile subscriber identification data from a customer via a mobile radio network;
   means for transmitting the mobile subscriber identification data and information describing the purchase request to a security device;
   means for receiving a transaction number for the purchase from the security device;
   means for receiving another transaction number for the purchase from the customer via the mobile radio network; and
   means for transmitting instructions for effecting the purchase to the security device if the transaction number received from the security device matches the another transaction number received from the customer.

22. The vendor device of claim 21, further comprising means for receiving the results of a credit check and a customer unblocked check from the security device.

23. A system for effecting a purchase of a customer from a vendor via the Internet and billing for the purchase, the system comprising:
   a security device;
   a vendor device;
   a customer device;
   means for transmitting a purchase request and mobile subscriber identification data representing a mobile subscriber identification number of the customer from said customer device to said vendor device via a mobile radio network;
   means for forwarding the purchase request and the mobile subscriber identification data from said vendor device to said security device;
   means for transmitting, by the security device, at least the mobile subscriber identification number related to the mobile subscriber identification data received from the vendor to the mobile radio network;
   means for generating a transaction number and transmitting the transaction number for the purchase from the mobile radio network to said customer device and said security device in response to receiving the at least the mobile subscriber identification number from the security device;
   means for forwarding the transaction number from said customer device to said vendor device;
   means for checking, by the security device, whether the transaction number forwarded to said vendor device by said customer device is valid by determining whether the transaction number forwarded to the vendor by the customer matches the transaction number transmitted to the security device by the mobile radio network; and
   means for initiating billing of the purchase at said security device if the transaction number forwarded to the vendor by the customer is valid.

* * * * *